US006233019B1

United States Patent
Kondo et al.

(10) Patent No.: US 6,233,019 B1
(45) Date of Patent: May 15, 2001

(54) IMAGE CONVERTER AND IMAGE CONVERTING METHOD FOR IMPROVING IMAGE QUALITY

(75) Inventors: Tetsujiro Kondo; Yasushi Tatehira; Hideo Nakaya, all of Kanagawa; Takaya Hoshino, Saitama; Masaaki Hattori, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/226,808

(22) Filed: Jan. 6, 1999

Related U.S. Application Data (63) Continuation of application No. PCT/JP98/02009, filed on May 6, 1998.

(30) Foreign Application Priority Data

May 6, 1997 (JP) .................................. 9-115437

(51) Int. Cl.[7] ...................................... H04N 7/01
(52) U.S. Cl. .......................................... 348/458; 348/615
(58) Field of Search .................................. 348/458, 448, 348/625, 607, 444, 615, 618, 581; 382/274, 298–300

(56) References Cited

U.S. PATENT DOCUMENTS

| | | |
|---|---|---|
| 5,049,990 | 9/1991 | Kondo et al. . |
| 5,390,264 | 2/1995 | Ishihara et al. . |
| 5,852,470 * | 12/1998 | Kondo et al. .................... 348/448 |
| 5,903,481 | 5/1999 | Kondo et al. . |
| 5,912,708 | 6/1999 | Kondo et al. . |
| 5,940,132 | 8/1999 | Kondo et al. . |

FOREIGN PATENT DOCUMENTS

| | | |
|---|---|---|
| 0 361 538 | 4/1990 | (EP) . |
| 0 640 908 | 3/1995 | (EP) . |
| 59-47881 | 3/1984 | (JP) . |
| 8-51599 | 2/1996 | (JP) . |

* cited by examiner

*Primary Examiner*—Victor Kostak
(74) *Attorney, Agent, or Firm*—Frommer Lawrence & Haug, LLP.; William S. Frommer; Dexter T. Chang (57) ABSTRACT

The invention concerns a device and a method for converting a first image signal that is comprised of plural pixel data into a second image data that is comprised of plural pixel data. In particular, according to the image converter and the image converting method of the invention, even if the image quality of the inputted image data is poor, it is able to extract the optimal pixel data as the class tap or the predictive tap, and to perform the adequate prediction processing, since clipping of the class tap or the predictive tap is controlled in response to the feature quantity that represents the quantity of fuzz of the inputted image data.

40 Claims, 8 Drawing Sheets

EDGE CODE = 0

FIG. 8

EDGE CODE = 1

FIG. 9

TAP STRUCTURE OF THE TIME
OF EDGE CODE = 0

FIG. 10

TAP STRUCTURE OF THE TIME
OF EDGE CODE = 1

IMAGE CONVERTER AND IMAGE CONVERTING METHOD FOR IMPROVING IMAGE QUALITY

This is a continuation of PCT/JP98/02009 filed May 6, 1996

FIELD OF THE INVENTION

This invention relates to pixel converting devices and methods. Especially, it relates to pixel converting devices and methods for surely correcting a fuzzy image.

DESCRIPTION OF THE PRIOR ART

The applicant has proposed the technique that makes it possible to obtain pixel data with higher resolution, as the Japanese Provisional Publication No. 51599 of 1996, for instance. In this proposition, in the case where image data that is comprised of HD (High Definition) pixel data is created from image data that is comprised of SD (Standard Definition) pixel data, classification is performed (the class is determined) using SD pixel data that sits on the vicinity of the HD pixel data created. Prediction coefficient value set is previously learned for each class. The HD pixel data that is nearer to the true value is obtained, utilizing inter-frame correlation, in the image quiescent portion, and utilizing inter-field correlation, in the moving portion.

By the way, using this technique, it is able to correct image data whose image quality is very poor (fuzzy image) into image data having favorable image quality, for instance. However, in the case of image data whose image quality is very poor, if classification is performed using this image data whose image quality is very poor, it is not able to perform suitable classification and to determine the suitable class. Therefore, as the suitable class can not be obtained, the suitable predictive coefficient value set can not be obtained, and, after all, there has been such a problem that it is not able to sufficiently correct the image quality.

SUMMARY OF THE INVENTION

In consideration of such a situation, the present invention proposes the image converting device and method for surely correcting the image quality even if the image quality of the inputted image data is poor.

The image converter of the present invention is an image converter for converting a first image signal that is comprised of plural pixel data into a second image data that is comprised of plural pixel data comprising: a class tap extracting circuit for extracting plural pixel data for producing a class code out of the first image data as a class tap; a classification circuit for classifying the class tap, to generate the class code that represents the class; a generating circuit for generating prediction data that correspond to the class code; a producing circuit for outputting the second image signal by the use of the prediction data; and a detecting circuit for detecting a feature quantity that represents the degree of fuzz of the image of the first image signal, and for controlling the class tap extracting operation of the first extracting circuit in accordance with the result of the detection.

Besides, the image converting method of the present invention is a method for converting a first image signal that is comprised of plural pixel data into a second image data that is comprised of plural pixel data, said method comprising the steps of: extracting plural pixel data for producing a class code out of the first image data as a class tap; classifying the class tap, to generate the class code that represents the class; generating prediction data that corresponds to the class code; outputting the second image signal by the use of the prediction data; detecting a feature quantity that represents the degree of fuzz of the image of the first image signal; and controlling the class tap extracting operation in accordance with the result of the detection.

Therefore, according to the image converter and the image converting method of the present invention, even if the image quality of the inputted image data is poor, it is able to extract the optimal class tap and to perform the optimal prediction processing, since the class tap is controlled in response to the feature quantity that represents the quantity of fuzz of the inputted image data.

DESCRIPTION OF THE PREFERRED EMBODIMENT

Figure 1:
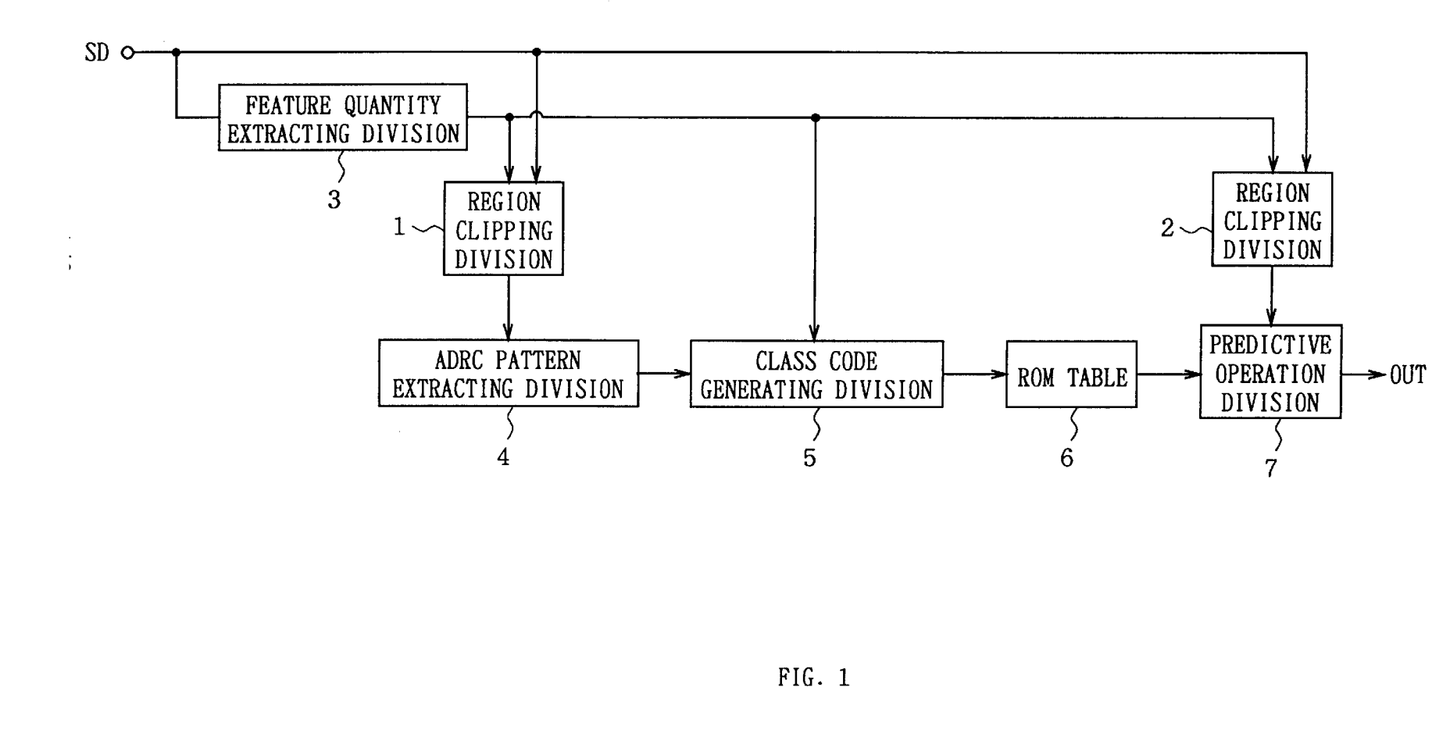
FIG. 1 is a block diagram showing an example of a configuration of an image converter according to the invention.

An embodiment of the present invention will be explained below. FIG. 1 is a block diagram showing an example of a configuration of an image converter according to the invention. In this example of configuration, a configuration is shown for converting, for instance, SD image data (or HD image data) whose image quality is poor (fuzzy image) into SD image data (or HD image data) whose image quality has been improved. Hereinafter, an explanation is given to the case where the inputted image data is SD image data.

For instance, image data whose image quality is poor (fuzzy image) is inputted to an image converter via an input terminal. The inputted image data is supplied to a region clipping division 1, a region clipping division 2, and a feature quantity extracting division 3. The feature quantity extracting division 3 detects a feature quantity that represents the quantity of fuzz of the inputted SD image data, and delivers the detected feature quantity to the region clipping division 1, the region clipping division 2, and a class code generating division 5. The region clipping division 1 clips a set of class taps of the stated range from the inputted pixel data, and delivers this to an ADRC (Adaptive Dynamic Range Coding) pattern extracting division 4. The class tap that is clipped at the region clipping division 1 is controlled in accordance with the feature quantity that is outputted by the feature quantity extracting division 3. The ADRC pattern extracting division 4 would perform classification, for the purpose of wave-form representation in the space.

The class code generating division 5 generates a class code that corresponds to the class that has been outputted from the ADRC pattern extracting division 4 and to the feature quantity that has been outputted from the feature quantity extracting division 3, and delivers this to a ROM table 6. The stated predictive coefficient set that is corresponding to each class (class code) has been previously stored in the ROM table 6, and it delivers the predictive coefficient set that is corresponding to the class code to a predictive operation division 7.

The region clipping division 2 clips the pixel data of the stated range from the inputted image data as a predictive tap set, and delivers the pixel data that compose the predictive tap to a predictive operation division 7. The predictive tap set that is clipped by the region clipping division 2 is controlled in accordance with the feature quantity that is outputted from the feature quantity extracting division 3 and representing the quantity of fuzz. The predictive operation division 7 performs predictive operation on the basis of the predictive tap set that has been inputted from the region clipping division 2 and the predictive coefficient set that has been inputted from the ROM table 6, and outputs the result of the operation as image data whose image quality has been corrected. Thus outputted image data is displayed with a displaying device which is not shown, recorded in a recording device, or transmitted with a transmitting device.

Figure 2:
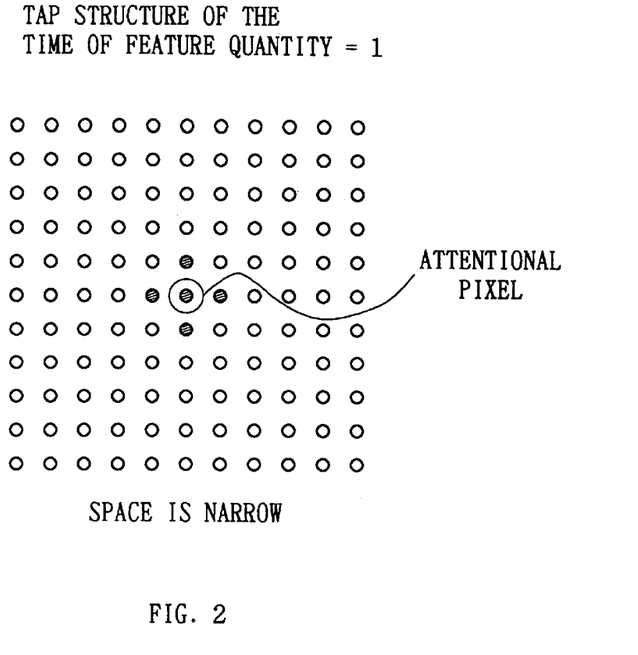
FIG. 2 is a diagram illustrating a clipping process in a region clipping division 1 of FIG. 1.
Figure 3:
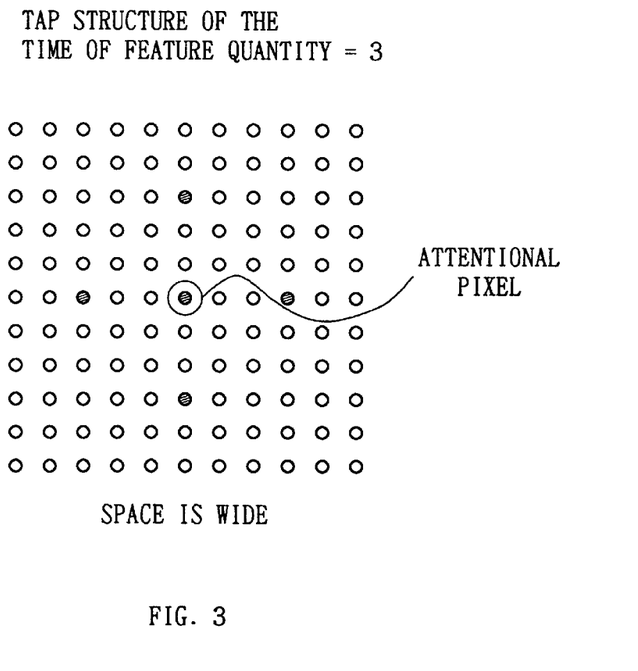
FIG. 3 is a diagram illustrating the clipping process in the region clipping division 1 of FIG. 1.

Next, the operation will be explained. When image data has been inputted, the region clipping division 1 clips the stated pixel data out of the inputted image data as a class tap. For instance, as shown in FIG. 2, it clips five pixel data in amount, that is, an attentional pixel data and the neighboring pixel data of upward, downward, leftward, and rightward directions, as a class tap. Or, as shown in FIG. 3, it extracts an attentional pixel data and the neighboring pixel data of upward, downward, leftward, and rightward directions, that are distant from the attentional pixel data by a distance corresponding to three pixels, as a class tap. What pixel data is clipped as a class tap is determined in accordance with the feature quantity that represents the quantity of fuzz and that is outputted by the feature quantity extracting division 3.

Figure 4:
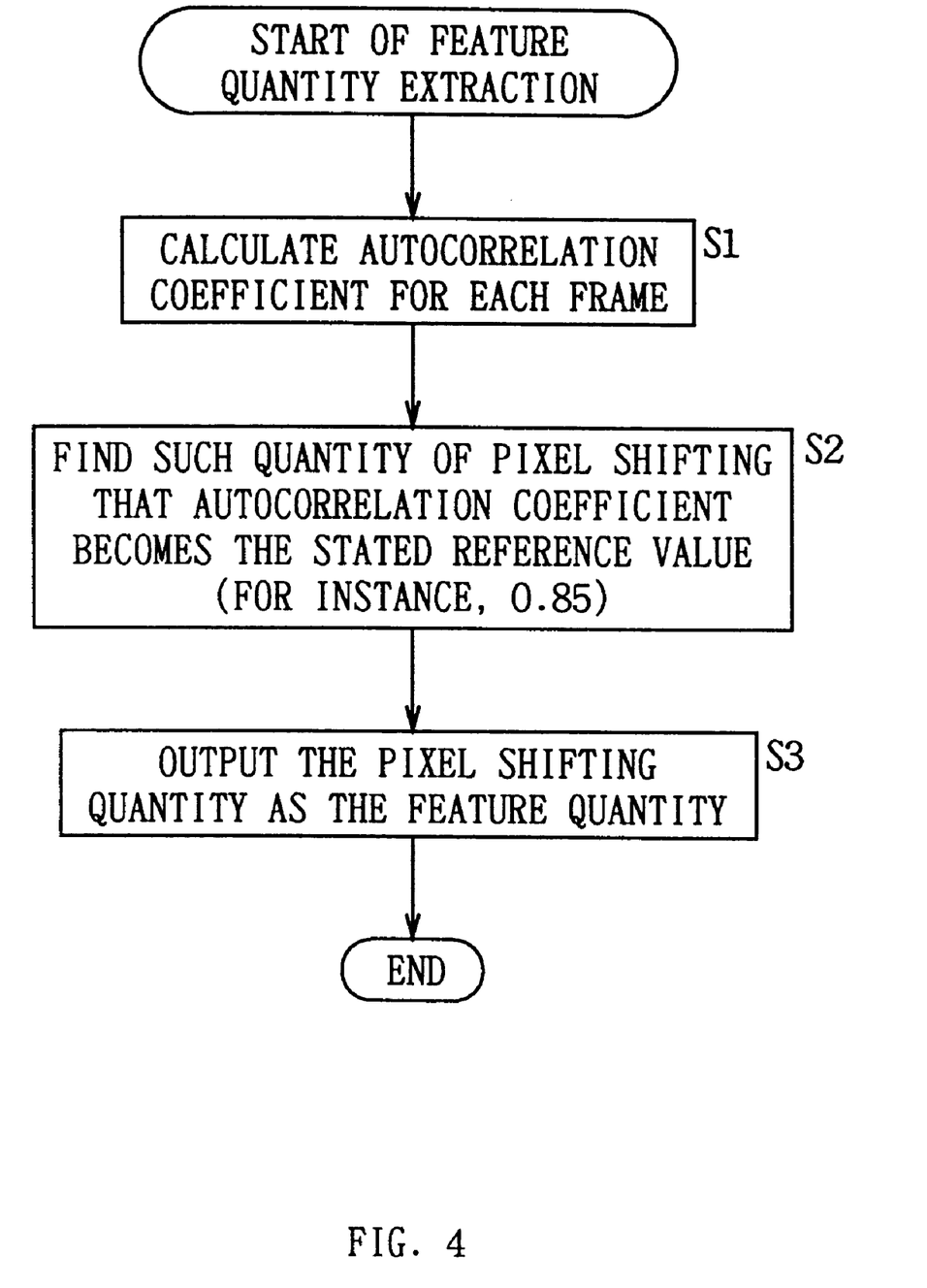
FIG. 4 is a flow chart illustrating a feature quantity extracting process in a feature quantity extracting division 3 of FIG. 1.
Figure 5:
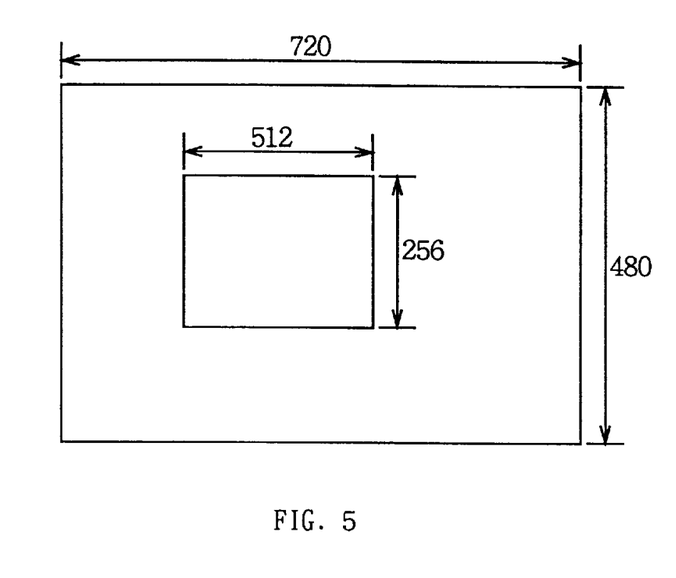
FIG. 5 is a diagram illustrating a process of calculating an autocorrelation coefficient of a step S1 of FIG. 4.

Next, the feature quantity extracting process of the feature quantity extracting division 3 will be explained, referring to a flow chart of FIG. 4. First, at the step S1, the feature quantity extracting division 3 calculates the autocorrelation coefficient of each frame, with respect to each pixel data of the inputted image data. And, this autocorrelation coefficient is utilized as a scale of the feature quantity that represents the quantity of fuzz of the pixel data. That is, supposing that the image data of one frame is comprised of pixel data of 720 pixels×480 pixels as shown in FIG. 5, then, a block (referred to as the reference block, according to circumstances) is formed that is comprised of pixel data of 512 pixels×256 pixels out of pixel data of 720 pixels×480 pixels, and centered at the stated attentional pixel data. The position of the reference block is moved to upward, downward, leftward, and rightward directions, within the stated range, in units of pixel, and the autocorrelation coefficients are calculated that correspond to the respective moved positions. The autocorrelation coefficient that corresponds to the position of the time when the reference block has been moved is represented by the following equation

AUTOCORRELATION COEFFICIENT =

$$\frac{\sum_{i=0}^{n}\sum_{j=0}^{m}((X_{ij}-\overline{X})\cdot(Y_{ij}-\overline{Y}))}{\sqrt{\sum_{i=0}^{n}\sum_{j=0}^{m}(X_{ij}-\overline{X})^2}\sqrt{\sum_{i=0}^{n}\sum_{j=0}^{m}(Y_{ij}-\overline{Y})^2}}$$

where a value of each pixel in a reference block that has been centered at the stated attentional pixel data is designated as $X_{ij}$ (i=0, 1, 2, . . . n; j=0, 1, 2, . . . m), a mean value of pixel values in the reference block is designated as $\overline{X}$, a value of each pixel in a block that corresponds to the position to which the reference block has been moved is designated as $Y_{ij}$ (i=0, 1, 2, . . . , n; j=0, 1, 2, . . . , m), and a mean value of pixel values in the block is designated as $\overline{Y}$.

As stated above, the reference block of this embodiment is comprised of the pixel data of 512 pixels×256 pixels, so the value of n equals to 511, and the value of m equals to 255. In this manner, the reference block is shifted within the stated range, and the autocorrelation coefficients that correspond to the respective positions can be obtained.

Figure 6:
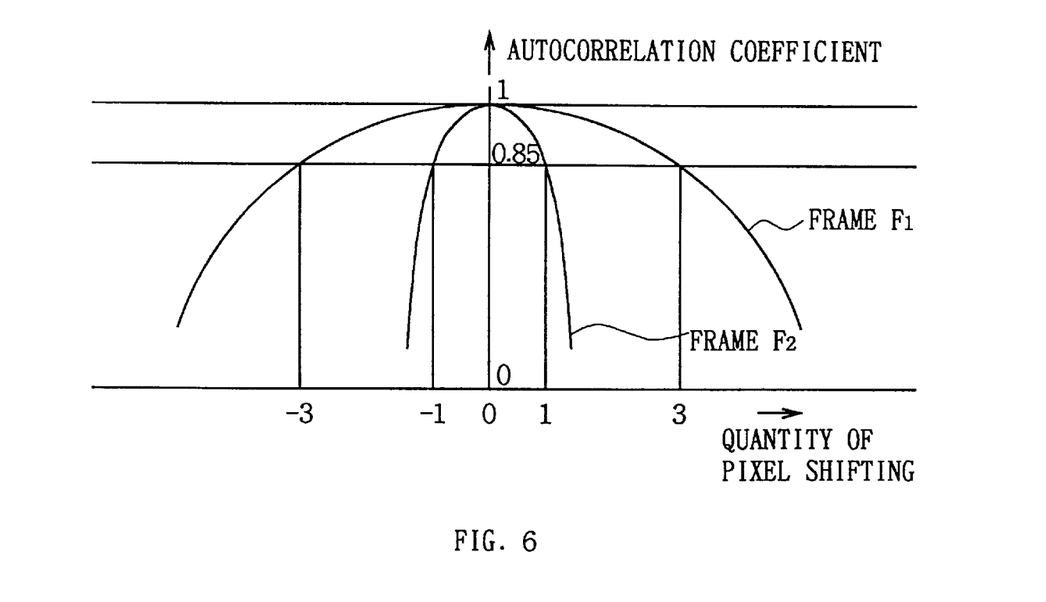
FIG. 6 is a diagram illustrating the autocorrelation coefficient that is calculated in the step S1 of FIG. 4.

FIG. 6 is showing examples of the autocorrelation coefficient that has been calculated in this manner. When the block (reference block) is not shifted, the autocorrelation coefficient is 1. While, in the case of a frame F1, when the block (reference block) has been shifted right by a magnitude that corresponds to three pixels, the autocorrelation coefficient lowers to 0.85, besides, the more the shifted quantity increases the more the autocorrelation coefficient lowers to the smaller value. This analogous to the case where the block (reference block) is shifted to the left.

On the other hand, in the case of a frame F2, when the block (reference block) has been shifted right or left by a magnitude that corresponds to one pixel, the autocorrelation coefficient lowers to 0.85, and when shifted furthermore, the autocorrelation coefficient further lowers. This means that the autocorrelation of the frame F1 is stronger than that of the frame F2, that is, the quantity of fuzz of the frame F1 is larger than that of the frame F2.

The feature quantity extracting division 3 finds such a quantity of pixel shifting that the autocorrelation coefficient becomes the stated reference value (for instance, 0.85) at the step S2, and then outputs the pixel shift quantity as a feature quantity that represents the fuzz quantity at the step S3. That is, by comparing the autocorrelation coefficients that correspond to the respective positions to which the reference block has been shifted within the stated range with the reference value, the pixel shift quantity by which the autocorrelation coefficient becomes the reference value is found. On the example of FIG. 6, in the case where the inputted pixel data is the pixel data of the frame F1, the feature quantity appears as 3, while, in the case where the inputted pixel data is the pixel data of the frame F2, the feature quantity appears as 1.

When the feature quantity 1 has been inputted from the feature quantity extracting division 3, the region clipping division 1 clips (extracts) the pixel data that have been located within the narrow space as the class tap, as shown in FIG. 2. On the other hand, when the feature quantity 3 has been inputted, the region clipping division 1 clips (extracts) the pixel data that have been located with the wider spaces as the class tap, as shown in FIG. 3.

As shown in FIG. 6, the range of pixel data that has strong autocorrelation coefficient is narrow, in the case of the image (frame F2) whose feature quantity is 1. So, as shown in FIG. 2, the pixel data that have been located in the narrow range are selected as the pixel data for composing the class tap. On the other hand, in the case of the image (frame F1) whose feature quantity is 3, the range having the strong autocorrelation coefficient is wider. So, as shown in FIG. 3, the pixel data for composing the class tap is clipped from the wider range. In this manner, by dynamically changes the pixel data that are clipped as the class tap, in response to the feature quantity which represents the quantity of fuzz, it becomes possible to clip more adequate class tap.

The pixel data that are clipped as the predictive tap at the region clipping division 2 are also dynamically changed, in response to the feature quantity that represents the fuzz quantity and that is outputted by the feature quantity extracting division 3, in the same way as clipping of the class tap at the region clipping division 1; where it is not illustrated. The manner of clipping the predictive tap at the region clipping division 2 may be identical to or may be different from that of the class tap at the region clipping division 1.

The ADRC pattern extracting division 4 executes ADRC processing toward the class tap that has been clipped at the region clipping division 1, and performs classification (determines the class). That is, designating a dynamic range in five pixel data that have been extracted as a class tap as DR, a bit allocation as n, a level of each pixel data as a class tap as L, and a re-quantization code as Q, the following equation is calculated.

$$Q=\{(L-\mathrm{MIN}+0.5)\times 2n/DR\}$$

$$DR=\mathrm{MAX}-\mathrm{MIN}+1$$

Where, { } means round-off operation, as used herein. MAX and MIN are representing the maximum value and the minimum value of five pixel data that compose a class tap, respectively. By this, assuming that five pixel data that are composing a class tap clipped at the region clipping division 1 are respectively comprised of, for instance, 8 bits (n=8), these are respectively compressed into 2 bits. Therefore, the data that is representing a spatial class which is represented with a total of 10 bits is supplied to the class code generating division 5.

The class code generating division 5 adds the bits representing the feature quantity that represents the fuzz quantity supplied from the feature quantity extracting division 3 to the data representing the spatial class that have been inputted from the ADRC pattern extracting division 4, to generate a class code. Assuming that the feature quantity that represents the fuzz quantity is represented by 2 bits, a class code of 12 bits is generated and supplied to the ROM table 6. This class code is corresponding to an address of the ROM table 6.

The predictive coefficient set that corresponds to each class (class code) is stored in the address corresponding to the class code of the ROM table 6, and, on the basis of the class code that has been supplied from the class code generating division 5, the predictive coefficient set $\omega 1$ through $\omega n$ that is stored in the address corresponding to the very class code is read and supplied to the predictive operation division 7.

To find a prediction result y, the predictive operation division 7 performs a product-sum operation shown in the following equation.

$$y=\omega 1\times 1+\omega 2\times 2+\ldots +\omega n\times n$$

where x1 through xn refer to pixel data that are composing the predictive tap which has been supplied from the region clipping division 2, and $\omega 1$ through $\omega n$ refer to the predictive tap set.

This predictive value y becomes the pixel data whose image quality (fuzz) has been corrected.

Figure 7:
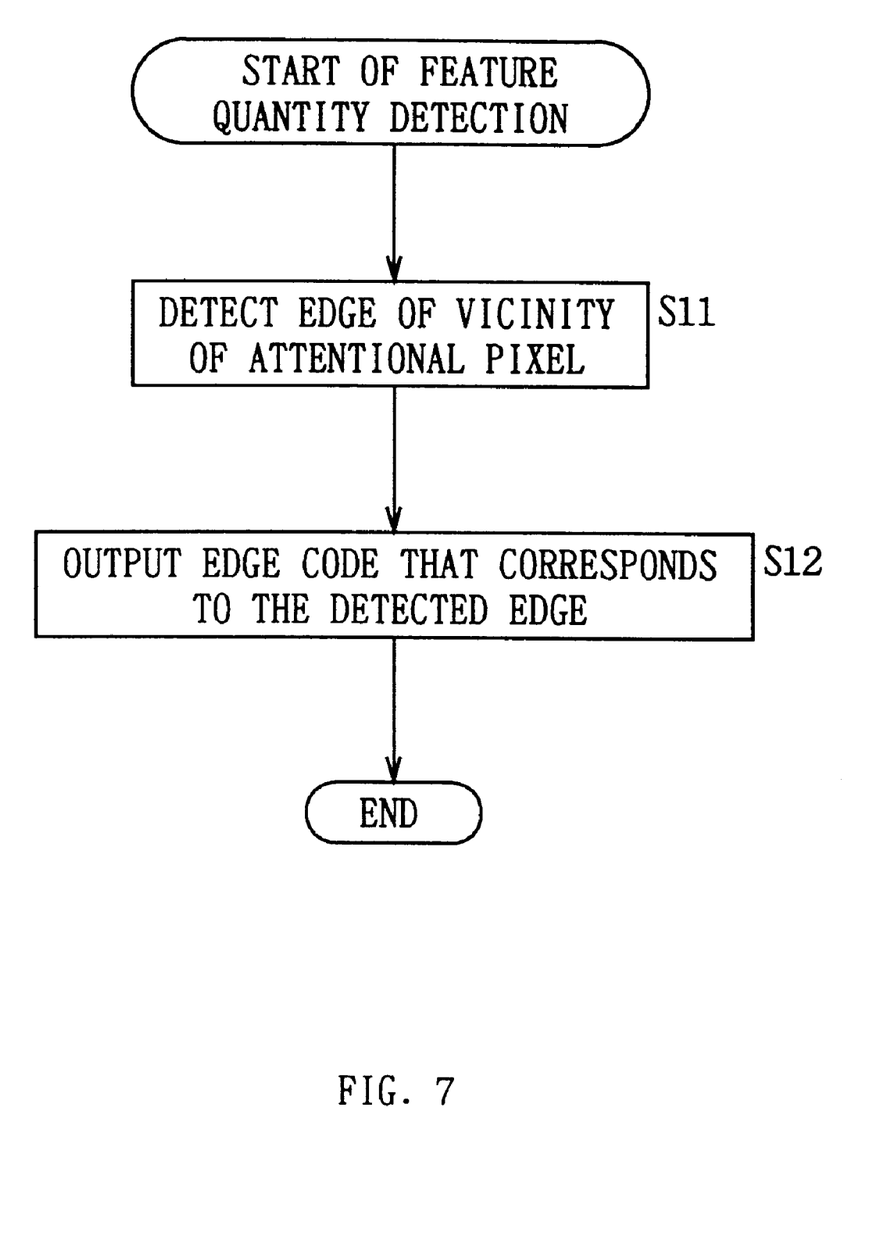
FIG. 7 is a diagram illustrating the other processing of feature quantity detection in the feature quantity extracting division 3 of FIG. 1.

FIG. 7 is showing the other example of feature quantity extracting process in the feature quantity extracting division 3. In this example, at the step S11, an edge of the vicinity of the stated attentional pixel is detected. At the step S12, an edge code that corresponds to the detected edge is outputted as the feature quantity. For instance, in the case where a skew edge that is lying from the upper right to the lower left has been detected as shown in FIG. 8, the feature quantity extracting division 3 outputs the edge code 0, and, in the case where a horizontal edge has been detected as shown in FIG. 9, it outputs the edge code 1.

Figure 8:
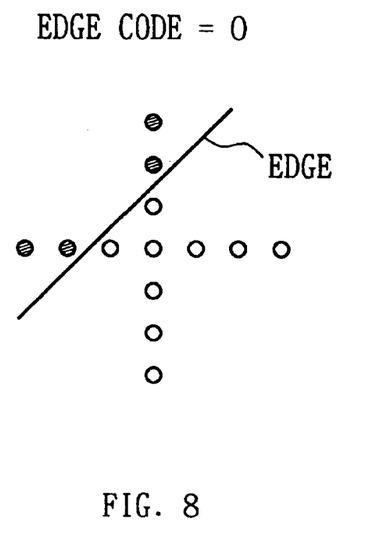
FIG. 8 is a diagram showing the other example of feature quantity detection in the feature quantity extracting division 3 of FIG. 1.
Figure 9:
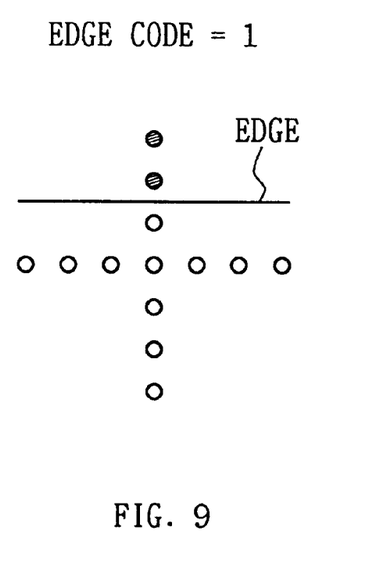
FIG. 9 is a diagram showing the other example of feature quantity detection in the feature quantity extracting division 3 of FIG. 1.
Figure 10:
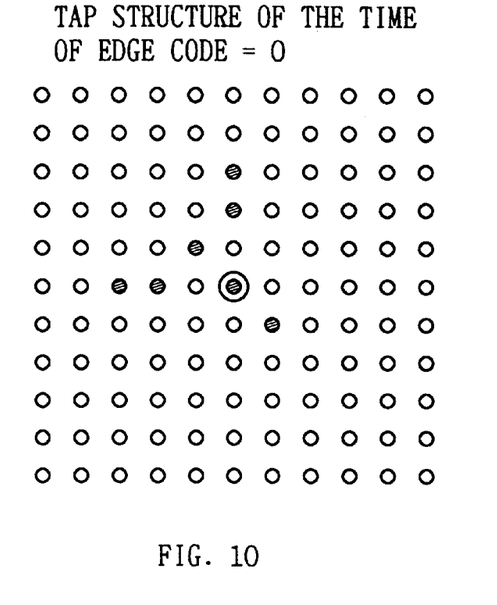
FIG. 10 is a diagram illustrating the clipping process in the region clipping division 1 of FIG. 1.
Figure 11:
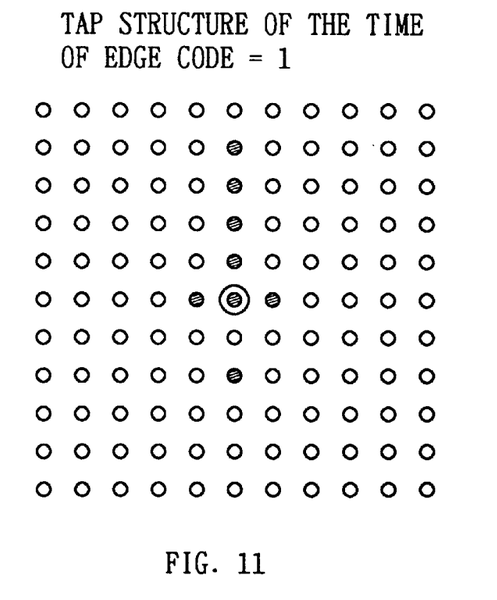
FIG. 11 is a diagram illustrating the clipping process in the region clipping division 1 of FIG. 1.

When the edge code 0 shown in FIG. 8 has been inputted from the feature quantity extracting division 3, the region clipping division 1 clips (extracts) such pixel data that are shown in FIG. 10 as a class tap. This class tap is comprised of pixel data that are optimum for detecting the edge which is lying from the upper right to the lower left. On the other hand, when the edge code 1 shown in FIG. 9 has been inputted, the region clipping division 1 clips (extracts) such pixel data that are shown in FIG. 11 as a class tap. This class tap is comprised of pixel data that are optimum for detecting the horizontal edge. In also the region clipping division 2, the process of clipping (extracting) pixel data that comprise the predictive tap is executed in response to the edge code, in like manner.

In this way, it is able to dynamically change the pixel data that are clipped as the class tap or the predictive tap in response to the feature quantity such as autocorrelation and an edge of the inputted pixel data, therefore, it becomes possible to obtain more adequate predictive operation result.

Figure 12:
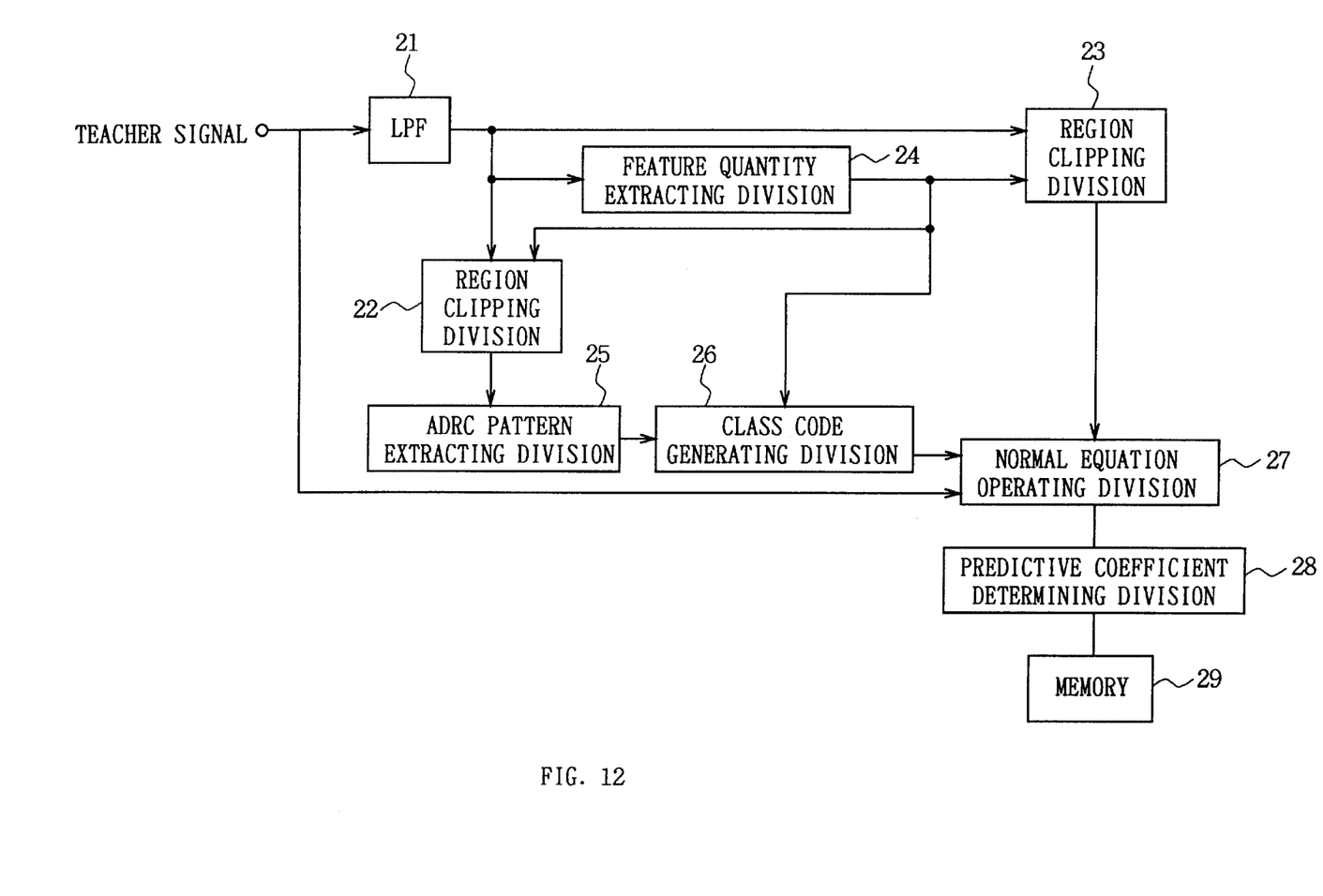
FIG. 12 is a block diagram showing an example of a configuration for performing the predictive coefficient learning process of a ROM table 6 of FIG. 1.

FIG. 12 shows an example of a configuration for obtaining the predictive coefficient set of each class (each class code) by learning, which is stored in the ROM table 6. Shown in this example of configuration is a configuration for producing a predictive coefficient set for each class (each class code), using SD image data (or HD image data) having favorable image quality that is treated as a teacher signal (learning signal). An example of configuration explained below is an example for producing a predictive coefficient set of each class that corresponds to the image converter of FIG. 1 of this embodiment.

For instance, image data having favorable image quality that function as a teacher signal (learning signal) is inputted to a normal equation operating division 27 and also inputted to a low-pass filter (LPF) 21. The LPF 21 eliminates the lower frequency components of the inputted image data that function as a teacher signal (learning signal), to produce the image data (learning signal) whose image quality has been deteriorated. The image data (learning signal) whose image quality has been deteriorated that is outputted from the LPF 21 is inputted to a region clipping division 22 for clipping (extracting) the image data of the stated range as a class tap, a region clipping division 23 for clipping (extracting) the image data of the stated range as a predictive tap, and a feature quantity extracting division 24 for extracting the feature quantity that represents the fuzz quantity. The feature quantity extracting division 24 extracts the feature quantity that represents the fuzz quantity of the pixel data of the inputted image data (learning signal) whose image quality has been deteriorated, and supplies the extracted feature quantity to the region clipping division 22, the region clipping division 23, and a class code generating division 26. The region clipping division 22 and the region clipping division 23 dynamically change the pixel data that are clipped as a class tap or a predictive tap in response to the inputted feature quantity that represents the fuzz quantity.

An ADRC pattern extracting division 25 performs classification (determines the class) of the pixel data that functions as a class tap and that has been inputted from the region clipping division 22, and outputs the result of the classification to a class code generating division 26. The class code generating division 26 generates the class code from the classified class and the feature quantity that represents the fuzz quantity, and outputs it to the normal equation operating division 27. The respective configurations and operations of the region clipping division 22, the region clipping division 23, the feature quantity extracting division 24, the ADRC pattern extracting division 25, and the class code generating division 26 that have been mentioned above are identical to those of the region clipping division 1, the region clipping division 2, the feature quantity extracting division 3, the ADRC pattern extracting division 4, and the class code generating division 6 those are shown in FIG. 1, and so the explanation of those are omitted.

The normal equation operating division 27 produces a normal equation for each class (each class code) on the basis of the inputted teacher signal (learning signal) and the pixel data that functions as a predictive tap and that is supplied from the region clipping division 23, and then supplies the normal equation to a class predictive coefficient determining division 28. And, when the necessary number of normal equations have been obtained for each class, the normal equations are solved for each class using, for instance, the method of least squares, and the predictive coefficient set of each class is calculated. The found predictive coefficient set of each class is supplied from the predictive coefficient determining division 28 to a memory 29, and stored in the memory 29. This predictive coefficient set of each class that has been stored in the memory 29 would be written in the ROM table 6 of FIG. 1.

In the above-mentioned explanation, the predictive coefficient set is operated for each class by the configuration that is shown in FIG. 12, however, in practice, it may be operated by simulation using a computer, alternatively.

In this embodiment, from the predictive coefficient set of each class that has been calculated by the method shown in FIG. 12 and that has been stored in the ROM table 6 shown in FIG. 1, and the pixel data that have been clipped as the predictive tap, the pixel data whose image quality has been improved (fuzz has been alleviated) is produced; however, we do not intend to limit the present invention to such. Alternatively, a predictive value itself of the pixel data of each class (each class code) that has been operated by learning may be stored in the ROM table 6, and the predictive value may be read by the class code. In this case, it is able to omit the region clipping division 2 shown in FIG. 1 and the region clipping division 23 shown in FIG. 12, and the predictive operation division 7 shown in FIG. 1 is adapted to convert the pixel data that have been outputted from the ROM table 6 to the format that corresponds to the output device and then output it. Besides, in this case, utilizing force placement method, instead of the normal equation operating division 27 and the predictive coefficient determining division 28 shown in FIG. 12, the predictive value of each class is produced, and then this predictive value of each class is stored in the memory 29. Besides, instead of the predictive value itself of each class, the respective predictive values of each class may be normalized with the reference value, and the normalized predictive values of each class may be stored in the ROM table 6. In this case, in the predictive operation division 7 shown in FIG. 1, the predictive value is operated from the predictive value that has been normalized on the basis of the reference value.

Besides, in this embodiment, the number of the pixel data that are clipped as the class tap or the predictive tap is 5 in the case where the autocorrelation coefficient has been used, or 13 in the case where the edge code is found; however, we do not intend to limit the present invention to such. The number of the pixel data that are clipped as the class tap or the predictive tap may be any number. The more the number that is clipped as the class tap or the predictive tap becomes many, the more the degree of improvement of the image quality becomes higher, however, the quantity of operation increases and large memory is required, and so additional quantity of operation and additional hardware become large. Therefore, it is needed to set the optimum number.

Besides, in this embodiment, conversion of a SD image signal to a SD image signal (SD-SD conversion) and conversion of a HD image signal to a HD image signal (HD-HD conversion) have been described; however, we do not intend to limit the present invention to such. Of course, it is able to apply the present invention to conversion of the signals of the other format (such as an interlace signal, or a non-interlace signal). Besides, it is able to apply the present invention to conversion of the signals whose formats are different, such as conversion of a SD image signal to a HD image signal (SD-HD conversion) and conversion of an interlace signal to a non-interlace signal (interlace-non-interlace conversion) However, in this case, at the time of clipping the image data as a class tap or a predictive tap, a pixel that is to become the attentional pixel do not exist in practice, so it do not become the object pixel data for clipping.

A number of further variations and modifications may be made without departing from the spirit and scope of the present invention. Accordingly, the subject-matter of the present invention is not to be limited to the aspects of the embodiment.

As stated above, according to the image converter and the image converting method of the present invention, clipping of a class tap or a predictive tap is controlled in response to the feature quantity that represents the fuzz quantity of the inputted image data, therefore, even if the image quality of the inputted image data is poor, it is able to extract the optimum pixel data as a class tap or a predictive tap, and to perform adequate prediction processing.

Industrial Applicability

The present invention may be utilized for supplying an image signal having the corrected or improved quality of image, at the time when the inputted image signal is to be converted to an image signal of the same format or the different format, and the quality of image of the inputted image data is poor.

What is claimed is:

1. An image converter for converting a first image signal that is comprised of plural pixel data into a second image signal that is comprised of plural pixel data, comprising:

a class tap extractor for extracting pixel data from said first image signal to produce a class tap;

a classifier for classifying the produced class tap to generate a class code representing a class of pixels;

a generator for generating prediction data according to the generated class code;

a producer for producing said second image signal using the generated prediction data; and a detector for detecting a feature quantity in said first image signal that represents a degree of fuzziness in an image of said first image signal, said detector controlling a class tap extracting operation of said class tap extractor in accordance with the detected feature quantity.

2. The image converter according to claim 1, wherein said second image signal is a signal having an improved quality of image, in comparison with said first image signal.

3. The image converter according to claim 1, wherein said first image signal and said second image signal are image signals of the same format.

4. The image converter according to claim 1, wherein said generator includes a memory for storing the prediction data that have been previously produced for each class by learning, by the use of the learning signal whose quality of image is favorable, and said memory outputs the prediction data treating said class code as the address.

5. The image converter according to claim 1, further comprising a predictive tap extractor for extracting pixel data from the first image signal as a predictive tap, wherein said generator generates a set of prediction coefficients that correspond to the class code, and said producer performs a predictive operation using the predictive tap from said predictive tap extractor and the set of prediction coefficients from said generator, thereby outputting said second image signal.

6. The image converter according to claim 5, wherein said generator includes a memory for storing a set of prediction coefficients that have been previously produced for each class by learning, by the use of the learning signal whose quality of image is favorable, and said memory outputs the set of prediction coefficients treating said class codes as the addresses.

7. The image converter according to claim 1, wherein said detector shifts a block of the pixel data so as to calculate an autocorrelation coefficient at respective shifted positions, and detects the feature quantity in accordance with the respective autocorrelation coefficients detected at all the shifted positions.

8. The image converter according to claim 1, wherein the class code includes a first class code representing the class of pixels and a second class code representing the feature quantity that represents the degree of fuzziness in said image.

9. The image converter according to claim 7, wherein said detector determines one of the respective autocorrelation coefficients that corresponds to a reference value, and outputs a shift quantity of the pixel data that corresponds to the determined autocorrelation coefficient, as the feature quantity that represents the degree of fuzziness in said image.

10. The image converter according to claim 7, wherein each of the respective autocorrelation coefficients is a scale for representing the degree of fuzziness in the image.

11. An image converting method for converting a first image signal that is comprised of plural pixel data into a second image signal that is comprised of plural pixel data said method comprising the steps of:

extracting pixel data from said first image signal to produce a class tap;

classifying the produced class tap to generate a class code representing a class of pixels;

generating prediction data according to the generated class code;

producing said second image signal using the generated prediction data;

detecting a feature quantity in said first image signal that represents a degree of fuzziness in an image of said first image signal; and controlling the class tap extracting step in accordance with the detected feature quantity.

12. The image converting method according to claim 11, wherein said second image signal is a signal having an improved quality of image, in comparison with said first image signal.

13. The image converting method according to claim 11, wherein said first image signal and said second image signal are image signals of the same format.

14. The image converting method according to claim 11, wherein said prediction data generating step includes outputting the prediction data that have been previously produced for each class by learning by the use of the learning signal having favorable image quality and that have been stored in the memory, treating said class code as the address.

15. The image converting method according to claim 11, further comprising the step of extracting pixel data from said first image signal as a predictive tap, wherein said prediction data generating step includes generating a set of prediction coefficients that correspond to the class code; and said second image signal producing step includes a predictive operation using said predictive tap and said set of prediction coefficients, thereby producing said second image signal.

16. The image converting method according to claim 15, wherein said prediction data generating step includes outputting the set of prediction coefficients that have been previously produced for each class by learning by the use of the learning signal having favorable image quality and that have been stored in the memory, treating said class code as the address.

17. The image converting method according to claim 11, wherein said feature quantity detecting step includes shifting a block of the pixel data so as to calculate an autocorrelation coefficient at respective shifted positions, and detecting the feature quantity in accordance with the respective autocorrelation coefficients detected at all the shifted positions.

18. The image converting method according to claim 11, wherein the class code includes a first class code representing the class of pixels and a second class code representing the feature quantity that represents the degree of fuzziness in said image.

19. The image converting method according to claim 17, wherein said feature quantity detecting step includes determining one of the respective autocorrelation coefficients that corresponds to a reference value, and outputting a shift quantity of the pixel data that corresponds to the determined autocorrelation coefficient, as the feature quantity that represents the degree of fuzziness in said image.

20. The image converting method according to claim 17, wherein said autocorrelation coefficient represents the degree of fuzziness in the image.

21. An image converter for converting a first image signal that is comprised of plural pixel data into a second image data that is comprised of plural pixel data, comprising:

a class tap extractor for extracting pixel data from the first image data as a class tap;

a classifier for classifying the class tap to generate a class code;

a generator for generating prediction data according to the generated class code;

a prediction tap extractor for extracting pixel data from the first image signal as a prediction tap;

a producer for producing said second image signal using the prediction tap and the generated prediction data; and a detector for detecting a feature quantity in said first image signal that represents a degree of fuzziness in an image of said first image signal, said detector controlling a prediction tap extracting operation of said prediction tap extractor in accordance with the feature quantity.

22. The image converter according to claim 21, wherein said second image signal is a signal having an improved quality of image, in comparison with said first image signal.

23. The image converter according to claim 21, wherein said first image signal and said second image signal are image signals of the same format.

24. The image converter according to claim 21, wherein said generator includes a memory for storing previously produced prediction data by learning, by the use of the learning signal whose quality of image is favorable, and said memory outputs the prediction data treating said class code as the address.

25. The image converter according to claim 21, wherein
said generator generates a set of prediction coefficients that correspond to the class code, and said producer performs a predictive operation using the predictive tap from said predictive tap extractor and the set of prediction coefficients from said generator, thereby outputting said second image signal.

26. The image converter according to claim 25, wherein said generator includes a memory for storing previously produced prediction coefficients by learning, by the use of the learning signal whose quality of image is favorable, and said memory outputs the set of prediction coefficients treating said class codes as the addresses.

27. The image converter according to claim 21, wherein said detector shifts a block of the pixel data so as to calculate an autocorrelation coefficient at respective shifted positions, and detects the feature quantity in accordance with the respective autocorrelation coefficients detected at all the shifted positions.

28. The image converter according to claim 27, wherein each of the respective autocorrelation coefficients is a scale for representing the degree of fuzziness in the image.

29. The image converter according to claim 27, wherein said detector determines one of the respective autocorrelation coefficients that corresponds to a reference value, and outputs a shift quantity of the pixel data that corresponds to the determined autocorrelation coefficient, as the feature quantity that represents the degree of fuzziness in said image.

30. The image converter according to claim 21, wherein the class code includes a first class code representing the class of pixels and a second class code representing the feature quantity that represents the degree of fuzziness in said image.

31. An image converting method for converting a first image signal that is comprised of plural pixel data into a second image data that is comprised of plural pixel data, said method comprising the steps of:

extracting pixel data from said first image data as a class tap;

classifying the class tap to generate a class code;

generating prediction data according to the generated class code;

extracting pixel data from the first image signal as a prediction tap;

producing said second image data using the prediction tap and the generated predicted data;

detecting a feature quantity in said first image signal that represents a degree of fuzziness in an image of said first image signal; and controlling the prediction tap extracting step in accordance with the feature quantity.

32. The image converting method according to claim 31, wherein said second image signal is a signal having an improved quality of image, in comparison with said first image signal.

33. The image converting method according to claim 31, wherein said first image signal and said second image signal are image signals of the same format.

34. The image converting method according to claim 31, wherein said prediction data generating step includes outputting the prediction data that have been previously produced for each class by learning by the use of the learning signal having favorable image quality and that have been stored in the memory, treating said class code as the address.

35. The image converting method according to claim 31, wherein said prediction data generating step includes generating a set of prediction coefficients that correspond to the class code, and said second image signal producing step includes a predictive operation using said predictive tap and said set of prediction coefficients, thereby producing said second image signal.

36. The image converting method according to claim 35, wherein said prediction data generating step includes outputting the set of prediction coefficients that have been previously produced for each class by learning by the use of the learning signal having favorable image quality and that have been stored in the memory, treating said class code as the address.

37. The image converting method according to claim 31, wherein said feature quantity detecting step includes shifting a block of the pixel data so as to calculate an autocorrelation coefficient at respective shifted positions, and detecting the feature quantity in accordance with the respective autocorrelation coefficients detected at all the shifted positions.

38. The image converting method according to claim 37, wherein said autocorrelation coefficient represents the degree of fuzziness in the image.

39. The image converting method according to claim 37, wherein said feature quantity detecting step includes determining one of the respective autocorrelation coefficients that corresponds to a reference value, and outputting a shift quantity of the pixel data that corresponds to the determined autocorrelation coefficient, as the feature quantity that represents the degree of fuzziness in said image.

40. The image converting method according to claim 31, wherein the class code includes a first class code representing the class of pixels and a second class code representing the feature quantity that represents the degree of fuzziness in said image.

* * * * *